(12) United States Patent
Aslot et al.

(10) Patent No.: US 11,036,431 B2
(45) Date of Patent: Jun. 15, 2021

(54) ACCESSING PERSISTENT MEMORY VIA LOAD AND STORE

(71) Applicant: International Business Machines Corporation, Armonk, NY (US)

(72) Inventors: Vishal C. Aslot, Round Rock, TX (US); Anil Kalavakolanu, Austin, TX (US); Brian W. Hart, Austin, TX (US); Evan Allen Zoss, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 16/452,624

(22) Filed: Jun. 26, 2019

(65) Prior Publication Data
US 2020/0409595 A1 Dec. 31, 2020

(51) Int. Cl.
| | |
|---|---|
| *G06F 3/06* | (2006.01) |
| *G06F 9/30* | (2018.01) |
| *G06F 12/10* | (2016.01) |
| *G06F 16/22* | (2019.01) |
| *G06F 21/44* | (2013.01) |

(52) U.S. Cl.
CPC .......... *G06F 3/0659* (2013.01); *G06F 3/0604* (2013.01); *G06F 3/0673* (2013.01); *G06F 9/30043* (2013.01); *G06F 12/10* (2013.01); *G06F 16/2282* (2019.01); *G06F 21/44* (2013.01); *G06F 2212/163* (2013.01)

(58) Field of Classification Search
CPC .. G06F 12/10; G06F 12/1009; G06F 12/1018; G06F 12/1027; G06F 12/1036; G06F 12/0292; G06F 3/0659; G06F 3/0604; G06F 2212/163; G06F 16/22; G06F 16/221; G06F 16/2228; G06F 16/2282
See application file for complete search history.

(56) References Cited

U.S. PATENT DOCUMENTS

| | | | |
|---|---|---|---|
| 9,513,830 B2 * | 12/2016 | Frost | ................... G06F 12/0246 |
| 9,690,716 B2 | 6/2017 | Li et al. | |
| 10,423,541 B1 * | 9/2019 | Levin | ...................... G06F 12/08 |

(Continued)

OTHER PUBLICATIONS

Desai D, Schildhauer WF, "Software Recovery of Page Faults on Microprocessors with Integrated Memory Management Unit", An IP.com Prior Art Database Technical Disclosure, Mar. 1, 1992. (Year: 1992).*

(Continued)

*Primary Examiner* — Khoa D Doan
(74) *Attorney, Agent, or Firm* — William H. Hartwell; Isaac J. Gooshaw

(57) ABSTRACT

A system for generating memory references is provided. Instructions to perform a memory data operation on a database from a computer system is received. A computing system generates a memory reference in a region of memory, wherein the memory reference is independent of where the memory is accessible by a computing system. A memory reference to a memory region on a database is stored by a computing system. A memory reference based, at least, on the memory data operation is translated. A data in the memory via the instruction to perform a memory data operation is accessed. A memory data from the database is retrieved.

20 Claims, 8 Drawing Sheets

(56) References Cited

U.S. PATENT DOCUMENTS

| | | | |
|---|---|---|---|
| 2011/0082967 A1* | 4/2011 | Deshkar | G06F 12/0873 711/103 |
| 2014/0101403 A1* | 4/2014 | Martin | G06F 12/1036 711/206 |
| 2014/0195480 A1 | 7/2014 | Talagala et al. | |
| 2016/0232103 A1 | 8/2016 | Schmisseur et al. | |
| 2017/0039142 A1* | 2/2017 | Sundararaman | G06F 3/0673 |

OTHER PUBLICATIONS

Peter J. Denning; Craig H. Martell; Vint Cerf, "Memory," in Great Principles of Computing, MIT Press, 2015, pp. 123-148. (Year: 2015).*

H. Alam, T. Zhang, M. Erez and Y. Etsion, "Do-it-yourself virtual memory translation," 2017 ACM/IEEE 44th Annual International Symposium on Computer Architecture (ISCA), Toronto, ON, 2017, pp. 457-468, doi: 10.1145/3079856.3080209. (Year: 2017).*

"Method and System for Collecting Garbage of a Persistent Change log of a Memory Data Structure", IP.com Prior Art Database Technical Disclosure, Authors et al.: Disclosed Anonymously, IP.com No. IPCOM000235735D, Electronic Publication date—Mar. 24, 2014, 2 pages.

"Method to handle memory errors during VM migration", IP.come Prior Art Database Technical Disclosure, Authors et al: Disclosed Anonymously, IP.com No. IPCOM000255762D, Electronic Publication Date: Oct. 12, 2018, 4 pages.

"Robust Sharable Memory Handle", IP.com Prior Art Database Technical Disclosure, Authors et al.: Disclosed Anonymously, IP.com No. IPCOM000226289D, Electronic Publication Date: Mar. 26, 2013, 3 pages.

Dulloor, S.,"System and Applications for Persistent Memory", Georgia Institute of Technology, Doctor of Philosophy in the College of Computing, Thesis, Dec. 2015, Copyright © 2016 by Subramanya R. Dulloor, 105 pages.

Viglas, S., "Write-limited sorts and joins for persistent memory", Proceedings of the VLDB Endowment, vol. 7, No. 5, copyright 2014, pp. 413-424.

Volos et al., "Mnemosyne: Lightweight Persistent Memory", ASPLOS'11, Mar. 5-11, 2011, Newport Beach, California, Copyright © 2011 ACM, 13 pages.

* cited by examiner

ACCESSING PERSISTENT MEMORY VIA LOAD AND STORE

BACKGROUND OF THE INVENTION

The present invention relates generally to the field of persistent memory, and more particularly to persistent pointers.

Persistent memory here includes devices that provide non-volatile storage that can be directly accessed by a computer system. A persistent memory is addressable like a standard computer memory. A computer system accesses a persistent memory using single processor instructions (e.g. load or store), rather than by submitting an access request (e.g. read a block) via a communication device (e.g. SCSI adapter). The content of persistent memories survives intact across reboots or power cycles of the computer system.

Persistent memories need not be permanently attached to a computer system. They can be attached and detached over time (perhaps requiring the host be powered off during such a change). They may be attached to a single computer system at different addresses over time. And they may be attached to multiple computer systems concurrently.

SUMMARY

Embodiments of the present invention provide a method, system, and program product to generate memory references.

A first embodiment encompasses a method for executing a computer system to store memory references and to retrieve memory references from a database. One or more processors receive instructions to perform a memory data operation on a database. The one or more processors generate a memory refence in a region of memory, wherein the memory reference is independent of where the memory is accessible by a computing system. The one or more references store the memory reference to a memory region on a database. The one or more memory references translate the memory reference based, at least, on the memory data operation. The one or more processors access a data in the memory via the instruction to perform a memory data operation. The one or more processors retrieve the memory data from the database.

A second embodiment encompasses a computer program product for executing a computer system to store memory references and to retrieve memory references from a database. The computer program product includes one or more computer-readable storage media and program instructions stored on the one or more computer-readable storage media. The program instructions include program instructions to receive instructions to perform a memory data operation on a database. The program instructions include program instructions to generate a memory reference in a region of memory, wherein the memory reference is independent of where the memory is accessible by a computing system. The program instructions include program instructions to store the memory reference to a memory region on a database. The program instructions include program instructions to translate the memory reference based, at least, on the memory data operation. The program instructions include program instructions to access a data in the memory via the instructions to perform a memory data operation. The program instructions include program instructions to retrieve the memory data from the database.

A third embodiment encompasses a computer system for executing a computer system to store memory references and retrieve memory references from a database. The computer system includes one or more computer processors, one or more computer readable storage medium, and program instructions stored on the computer readable storage medium for execution by at least one of the one or more processors. The program instructions include program instructions to receive instructions to perform a memory data operation on a database. The program instructions include program instructions to generate a memory reference in a region of memory, wherein the memory reference is independent of where the memory is accessible by a computing system. The program instructions include program instructions to store the memory reference to a memory region on a database. The program instructions include program instructions to translate the memory reference based, at least, on the memory data operation. The program instructions include program instructions to access a data in the memory via the instructions to perform a memory data operation. The program instructions include program instructions to retrieve the memory data from the database.

DETAILED DESCRIPTION

Figure 1:
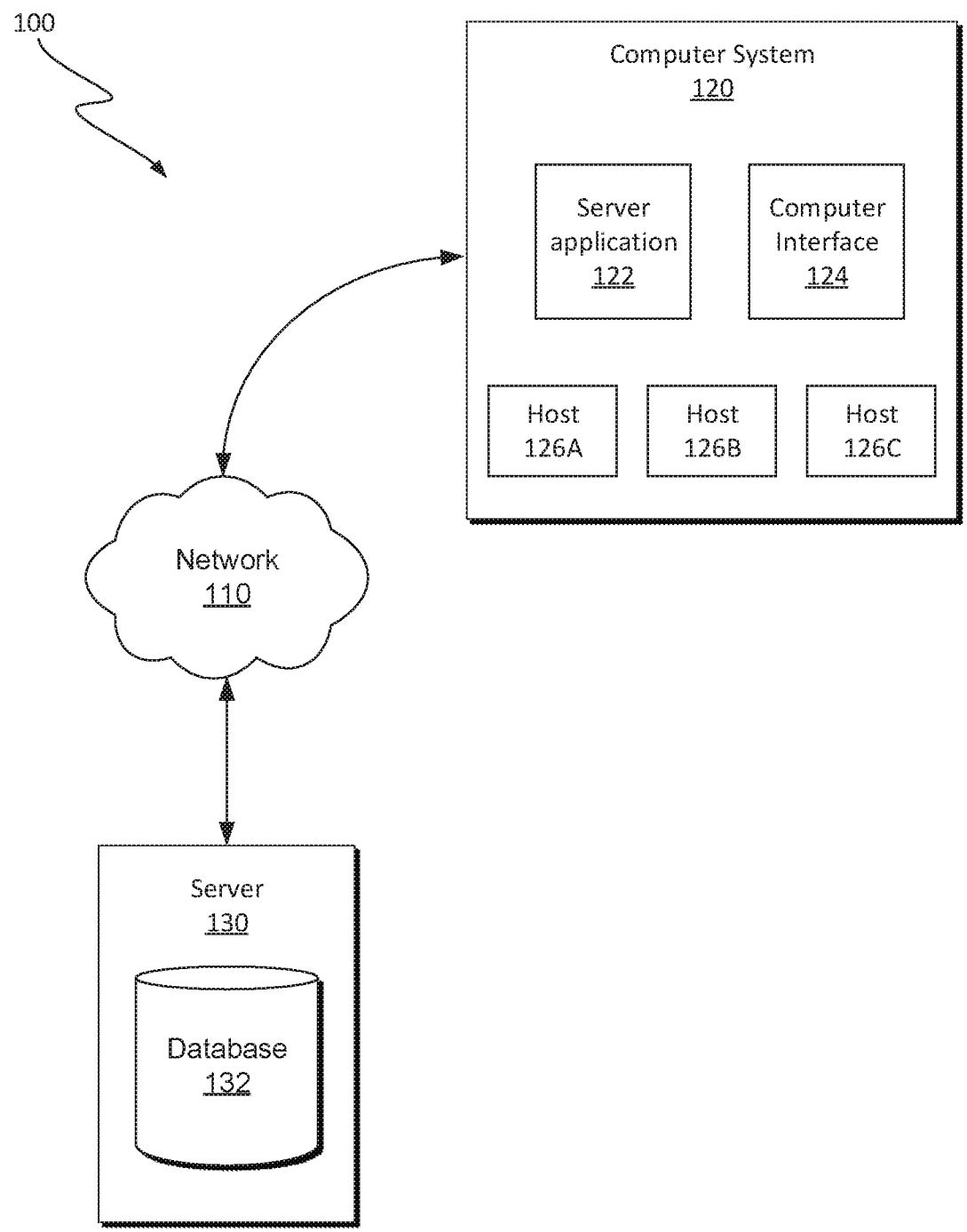
FIG. 1 is a functional block diagram illustrating a computing environment, in which a system to generate memory references is utilized, in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While possible solutions to references in persistent memory are known, these solutions may be inadequate to establish address translations to the persistent memory device as a whole and re-establish references during reboots and/or between multiple hosts, because these solutions often focus on references that are either inherently local to the single persistent memory device or that assume the persistent memory device is always attached at a fixed address. An inherently local reference might be a simple index into the persistent memory, or, if the persistent memory is mimicking a block device, a logical block address. To utilize an inherently local reference, the computing host would retrieve the reference, possibly multiply by a block size, and add the base address of the persistent memory. The operation would require multiple CPU instructions and likely require multiple CPU registers. A persistent memory attached at a fixed address could include references whose use would not require multiple instructions or registers but would not tolerate the persistent memory being attached to the computing system at a different address.

Embodiments of the present invention recognize that large regions of persistent memory can be attached to computing systems. Embodiments of the present invention recognize that the capacity of these memory regions may reach sizes that are comparable to external storage. Embodiments of the present invention recognize that these persistent regions can be accessed via a normal memory operation (load/store) rather than by using a storage protocol standard, such as, for example, Small Computer System Interface (SCSI).

Embodiments of the present invention recognize that such persistent memory regions can be accessed/attached to multiple hosts either concurrently or overtime (move from host to host). Embodiments of the present invention recognize that, since these regions behave as memory, certain embodiments may have the functionality to contain memory references that point to data located in the persistent memory. Embodiments of the present invention provide a solution that enables each host accessing the region the ability to associate their own address to the data.

For example, a persistent memory region is a good candidate for storing a filesystem. Traditional filesystems typically contain internal references, usually in terms of block address. Embodiments of the present invention recognize that a filesystem in a persistent memory region might instead contain internal references that act like pointers to memory. Embodiments of the present invention recognize that these references could be used directly for load/store by CPUs rather than requiring translation/presentation to I/O layer. Embodiments of the present invention recognize that, because the memory region can be attached at different addresses at different hosts, the memory references may be generated relative to the memory region rather than the memory references being absolute.

Embodiments of the present invention provide a method for handling pointers in persistent memory regions that is independent of where the region is attached. Embodiments of the present invention provide tagging of select memory regions and extra machine instructions for the loading/storage of pointers. Embodiments of the present invention use the tags to manage/manipulate access to those select memory regions.

Embodiments of the present invention leverage memory references, e.g., pointers, to persistent memory. Embodiments provide a solution that (i) forms and stores such memory references, (ii) translates information based, at least in part, on such memory references, and (iii) at least partly directs instruction execution based, at least in part, on such memory references. Embodiments of the present invention may establish address translations to an entire persistent storage device that can be re-established across reboots or between multiple hosts. Embodiments of the present invention provide and leverage pointer-like references on the persistent storage device to function as pointers on a given host.

Certain embodiments of the present invention provide access to persistent memory regions via execution of load/store instructions. Certain embodiments of the present invention generate and handle memory references in persistent memory regions independent of where the regions are attached. Certain embodiments of the present invention leverage use of CPU/compiler changes and tagging of certain memory regions to control, at least in part, access to persistent memory regions. Certain embodiments of the present invention may manage and otherwise manipulate access to the certain memory regions by leveraging (i) extra machine instructions for loading and storage of the memory references and (ii) the use of tags that are applied to the certain memory regions.

In various embodiments of the present invention, server application 122 executes one or more memory data operations that operate to load or store (or any combination thereof): (i) memory data and (ii) memory references (i.e., pointer-like references) to memory regions on a database (e.g., database 132). Various embodiments of the present invention recognize that the memory references operate independently and are accessible by any singular memory of a computing system. A memory reference may include, but is not limited to, (i) a memory ID and (ii) a relative real address that an application (i.e., server application 122) utilizes to reference the tables (i.e., PRAM table 802, PRAM table 804, and PRAM table 806) to translate the address of the memory reference. In addition, a memory reference operating independently indicates that an application can execute a memory data operation of a memory refence to any address of memory located on a database, wherein the memory reference is accessible across one or more host programs (i.e., host 126A-C).

In general, pointer-like references are assumed to exist in persistent memory storage when implementing methods to affect caches or methods to mix volatile and persistent data. Methods addressing persistent memory storage focus on implementations of safely updating persistent data structures before and/or after reboots and do not adequately describe the method in which pointer-like references are stored on persistent storage. In general, methods for persistent memory storage focus on management of persistent storage logs describing a data structure.

Embodiments of the present invention recognize that certain persistent memory storage methods may not provide an adequate method and system for attaching persistent memory to a host utilizing pointer-like references. Embodiments provide pointer-like reference systems that establish address translations to the persistent storage device as a whole that is capable of storing pointer-like references on a persistent storage device to function as pointers to host after reboots and/or for multiple hosts. In some embodiments, these pointer-like references are real address stored on physical persistent memory area (PRAM). Embodiments provide pointer-like references when data is stored in dynamic random-access memory (DRAM). In some embodiments, the computer system translates the pointer-like reference to a PRAM memory location to a real address and then to an application virtual address, using real-to-virtual (RVT) translation. In addition, the computer system will translate the application virtual address to a real address then a PRAM pointer-like reference before storing the reference as a pointer on persistent memory or DRAM.

In one embodiment, server application 122 receives instructions to perform a memory data operation on a database. Server application 122 generates a memory reference in a region of memory, wherein the memory reference is independent of where the memory is accessible by a computing system. Server application 122 stores the memory reference to a memory region located on, at least, database 134. Server application 122 translates the memory reference based, at least, on the memory data operation, wherein, the memory data operation includes, but is not limited to, a store and/or load instruction. Server application 122 accesses data in the memory via the instruction to perform a memory data operation, which includes, but is not limited to, a store and/or load of memory data from memory. Server application 122 retrieves the memory data from database 132.

In one embodiment, server application 122 assigns a memory ID to one or more memory regions located on, at least, database 132. Server application 122 stores the memory ID to the one or more memory regions. Lastly, server application 122 identifies one or more relative real addresses stored on database 132.

In one embodiment, host 126A-C generates a memory data operation to retrieve memory data stored on a memory region by, at least, one host program (i.e., host 126A-C). In another embodiment, server application 122 receives the memory data operation from host 126A-C to access memory data on the one or more memory regions. Server application 12 identifies (i) a memory ID and (ii) a relative real address that comprises a memory reference. Server application 122 executes the memory data operation to refer to one or more tables to translate the memory reference, wherein, the memory data is accessible across one or more host programs (i.e., host 126A, host 126B, host 126C, etc.).

In one embodiment, server application 122 retrieves the memory ID of the one or more memory regions. Server application 122 locates, at least, one relative real address associated with the memory ID. Server application 122 translates (i) the memory ID and (ii) the, at least, one real relative real address. Server application 122 generates a memory reference based, at least in part, (i) on the memory ID and (ii) at least one relative real address. Server application 122 executes a memory reference that points to, at least, one memory data located on the one or more memory regions. Server application 122 stores the memory reference on the one or more memory regions.

In one embodiment, server application 122 generates a memory data operation. Server application 122 transmits a store instruction to the central processing unit (CPU). Server application 122 identifies a memory ID associated with the memory data operation. Server application 122 translates the relative real address to a virtual address. Server application 122 generates a memory reference based, at least, (i) on the virtual address and (ii) the memory ID. Server application 122 determines a memory region based, at least, on the memory reference and executes a point instruction towards the memory region stored on a database. Server application 122 stores data as a virtual address on a database.

In one embodiment, server application 122 generates a memory data operation. Server application 122 transmits a load instruction to a central processing unit (CPU). Server application 122 retrieves a memory reference from a memory region based, at least, on an address associated with the load instruction. Server application 122 translates the memory reference to a relative real address. Server application 122 matches a translated relative real address to a relative real address associated with the memory data operation. Server application 122 authenticates, at least, the one host program. Server application 122 retrieves the memory data from the database and communicates the memory data to a host program (i.e., host 126A, etc.).

In one embodiment, server application 122 generates a memory data operation. Server application 122 transmits a load instruction to the one or more memory regions. Server application retrieves a memory reference from a memory region. Server application 122 authenticates, at least one host program. Server application 122 receives a page fault form the one or more memory regions. Server application 122 generates a valid page entry. Server application 122 restarts the load instruction to the one or more memory regions.

The present invention will now be described in detail with reference to the Figures.

FIG. 1 is a functional block diagram illustrating computing environment, generally designated 100, in accordance with one embodiment of the present invention. Computing environment 100 includes computer system 120 and server 130 connected over network 110. Computer system 120 includes server application 122, computer interface 124 and host 126A-C. Server 130 includes database 132. Server application 122 and host 126A-C include program instructions to perform the functions of the invention as described herein.

In various embodiments of the present invention, computer system 120 is a computing device that can be a standalone device, a server, a laptop computer, a tablet computer, a netbook computer, a personal computer (PC), a desktop computer or an programmable electronic device capable of receiving, sending, and processing data. In general, computer system 120 represents any programmable electronic device or combination of programmable electronic devices capable of executing machine readable program instructions and communication with application server 130. In another embodiment, computer system 120 represents a computing system utilizing clustered computers and components to act as a single pool of seamless resources. In general, computer system 120 can be any computing device or a combination of devices with access to server 130 and network 110 and is capable of executing server application 122, computer interface 124 and host 126A-C. Computer system 120 may include internal and external hardware components, as depicted and described in further detail with respect to FIG. 1.

In various embodiments of the present invention, server 130 is a storage system that includes database 132. Server 130 may include one or more, but is not limited to, computing devices, servers, server-cluster, web-servers, database and storage devices. Server 130 operates to communicate with computer system 120 over a network, such as network 110. For example, server 130 communicates with computer system 120 to transfer data between, but is not limited to, server application 122 and host 126A-C. The present invention recognizes that FIG. 1 may include (not shown) any number of computing devices, servers, databases and/or storage devices, and the present invention is not limited to what is depicted in FIG. 1.

In various embodiments of the present invention, server 130 is a computing device that can be a standalone device, a server, a laptop computer, a tablet computer, a netbook computer, a smartphone, a personal computer (PC), or a desktop computer. In another embodiment, server 130 represents a computing system utilizing clustered computers and components to act as a single pool of seamless resources. In general, server 130 can be any computing device or a combination of devices with access to computer system 120 and network 110. Server 130 may include internal and external hardware components, as depicted in further detail with respect to FIG. 1.

In this exemplary embodiment, server application 122, computer interface 124 and host 126A-C are stored on computer system 120. However, in other embodiments, server application 122, computer interface 124 and host 126A-C may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computer system 120 and server 130, in accordance with a desired embodiment of the present invention.

In this exemplary embodiment, database 132 is stored on server 130. However, in other embodiments, database 132 may be stored externally and access through a communication network, such as network 110. Network 110 can be for example, a local area network (LAN), a wide area network (WAN) such as the Internet, or a combination of the two, and may include wired, wireless, fiber optic or any other connection known in the art. In general, network 110 can be any combination of connections and protocols that will support communications between server 130 and computer system 120, in accordance with a desired embodiment of the present invention.

Computer system 120 includes computer interface 124. Computer interface 124 provides an interface between computer system 120 and server 130. In some embodiments, computer interface 124 can be a graphical interface (GUI) or a web user interface (WUI) and can display text, documents, web browser, windows, user options, application interfaces, and instructions for operation, and includes the information (such as graphic, text, and sound) that a program presents to a user and the control sequences the user employs to control the program. In some embodiments, computer system 120 accesses data communicated from server 130 via client-based application that runs on computer system 120. For example, computer system 120 includes mobile application software the provides an interface between computer system 120 and server 130.

In some embodiments depicted in FIG. 1, server application 122, at least in part, has access to computer interface 124 and can communicate data stored on server 130 to computer system 120. More specifically, computer interface 124 defines a user of computer system 120 that has access to data stored on database 132.

Server application 122, computer interface 124 and host 126A-C are depicted in FIG. 1 for illustrative simplicity, computer system 120, however, can include any number of logics and/or applications that are managed in accordance with server application 122. In general, server application 122 represents a physical or virtual resource to which the user represented by computer system 120 wishes to manage access. In some embodiments, server application 122 represents information, computer interface 124 and host 126A-C represents code that provides an ability to take specific action with respect to another physical or virtual resource and computer interface 124 manages the ability to take such actions. In some embodiments, server application 122 represents control over a physical or virtual resource and computer interface 124 manages the ability to use and modify the resource. In various embodiments, server application 122 represents a central processing unit (CPU), wherein server application 122 operates to perform basic arithmetic, logic, controlling and input/output (I/O) operations specified by the instructions of a computer program such as, but is not limited to, computer interface 124 and host 126A-C. Server application 122 can also represent any combination of the aforementioned elements. To illustrate various aspects of the present invention, examples of server application 122 are presented in which server application 122 represents one or more of: computer system firmware, hypervisor or other virtualizer, or computer operating system, are presented, but embodiments of server application 122 are not limited thereto. Embodiments of the present invention recognize that server application 122 may include other forms of transaction that are known in the art.

Database 132 are depicted in FIG. 1 for illustrative simplicity, server 130, however, can include any number of programs and/or applications, and databases that are managed in accordance with server application 122. In general, server application 122 represents a physical or virtual resource to which the administrator of the program represented by server 130 wishes to manage access. In some embodiments, server application 122 presents information and database 132 manages the ability to retrieve the information. In some embodiments, server application 122 represents code that provides an ability to take specific action with respect to another physical or virtual resource. In some embodiments, server application 122 represents control over a physical or virtual resource and host 126A-C manages the ability to use and modify the resource. Server application 122 can also represent any combination of the aforementioned elements. To illustrate various aspects of the present invention, examples of server application 122 are presented in which server application 122 represents one or more of: computer system firmware, hypervisor or other virtualizer, or computer operating system, are presented, but embodiments of server application 122 are not limited thereto.

In some embodiments of the present invention, server application 122 operates to communicate data to server 130 over a network, such as network 110. In some embodiments, server application 122 also represents one or more elements of host 126A-C. For example, server application 122 can include functionality for communicating with database 132 and requesting access to memory data stored on server 130, as described herein. Computer interface 124 can also represent a user interface ("UI") that operates to provide a UI (e.g., a graphical interface ("GUI")) to a user of computer system 120. In certain embodiments, the UI of computer interface 124 operates to receive user input from the user of computer system 120, thereby enabling the user to interact with database 132 operating on server 130. In certain such embodiments, the UI of server application 122 can also operate to enable the user to access and/or interact with server 130 through the authentication of the user via host 126A-C. In certain such embodiments, it is to be understood that computing environment 100 can include a plurality of computing devices without departing form the scope of the present invention.

In various embodiments depicted in FIG. 1, server application 122 operates to assign a unique and persistent wide memory ID (MID) to each physical memory area (e.g., DRAM and PRAM) during the initial program load in computing environment 100. In various embodiments of the present invention, PRAM represents "persistent random-access memory", and DRAM represents "dynamic random-access memory." Additionally, the width of the MIDs address is represented in number of bits, as a small integer, that is integrated with a virtual machine (VM) wide real address. Lastly, MIDs are stored on the respective physical memory area, wherein, once stored the value of the MID remains constant, thereby enabling the integrity of the plurality of pointer-like references stored on one or more PRAM locations. In various embodiments, DRAMs can include a plurality of addresses, wherein, server application 122 assigns one or more DRAMs with the value MID=0, wherein, in the absence of PRAMs, DRAMs continue to generate physical addresses. In various embodiments, server application 122 assigns PRAMs unique MIDs based, at least in part, but is not limited to, the location codes, jumper settings, serial numbers, chip IDs, etc.

Figure 8:
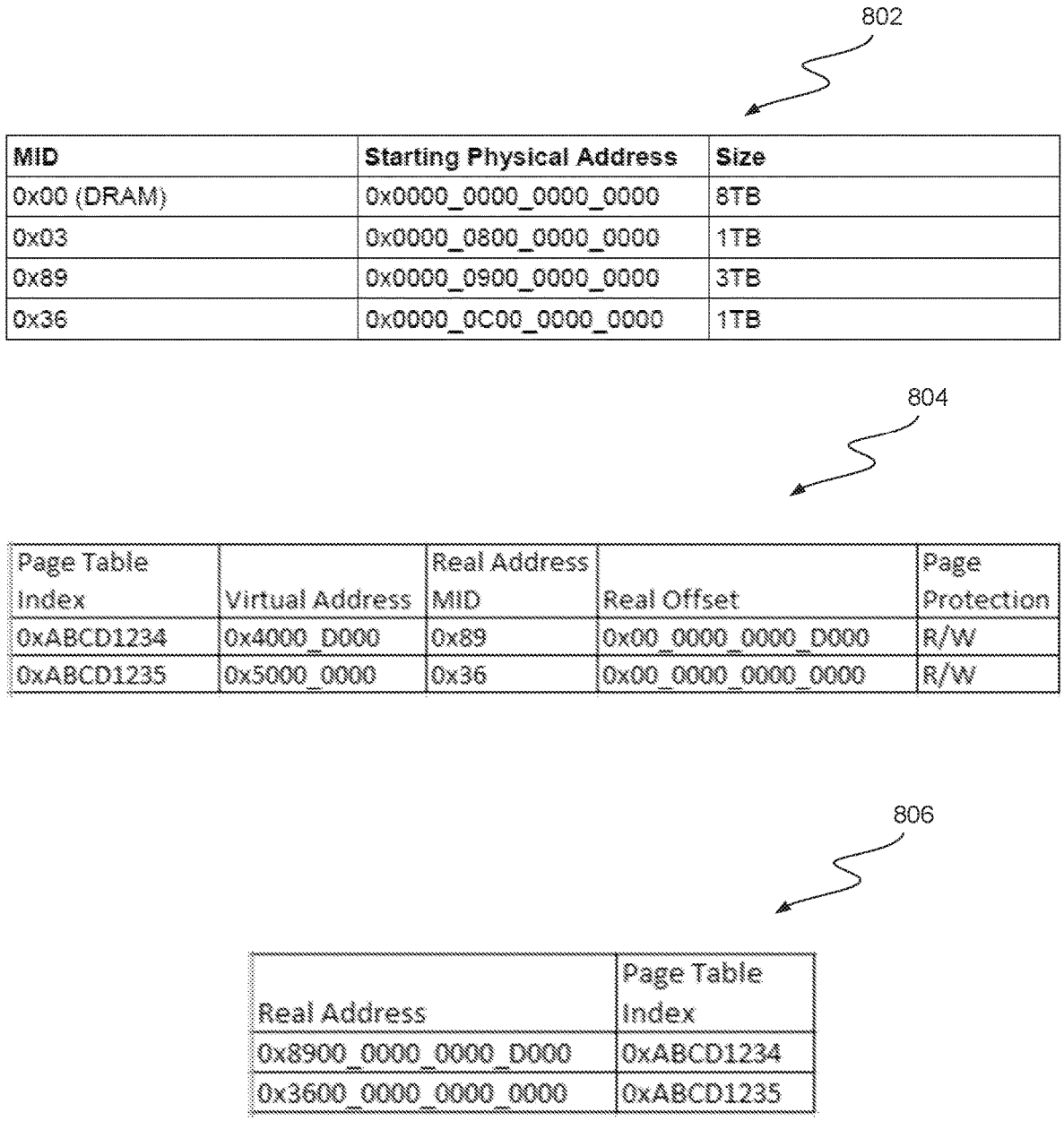
FIG. 8 depicts reference tables for translating memory references leveraged by the computing system within the computing environment depicted in FIG. 1, in accordance with an exemplary embodiment of the present invention.

In various embodiments depicted in FIG. 1, server application 122 access PRAM table 802, see FIG. 8. Server application 122 accesses the one or more PRAM tables to determine which physical addresses will correspond to each PRAM and MID. Additionally, each respective VM (e.g., LPAR) contains a unique PRAM table. The one or more PRAM tables contain a plurality of entries comprising a plurality of MIDs, where each entry corresponds to a unique MID and the one or more physical addresses of the PRAM relative to the VM memory. Additionally, server application 122 operates to initialize the entries in the PRAM table and attaches the MIDs to the one or more memory areas (i.e., PRAM and DRAM) during computing system power-on and transiently before server application 122 transfers control of the computer system to the operating system (OS).

In some embodiments depicted in FIG. 1, computer system 120 communicates with server 130 based, at least in part, on server application 122 and host 126A-C. Host 126A-C generates a memory access request based, at least in part, but is not limited to, host 126A-C attempting to operate on a data structure stored in PRAM. Host 126A-C communicates the memory access request to server application 122. Server application 122 defines an address range for accessing one or more memory areas in DRAM or PRAM. In various embodiments, server application 122 operates to transform one or more real addresses stored on the physical memory area (i.e., PRAM). In some embodiments depicted in FIG. 1, relative real addresses stored on PRAM run from 0 to the size (e.g. in bytes) of the PRAM−1. Additionally, references (i.e., pointer-like references) towards a location of memory data stored on PRAM are stored in the form of a <MID, relative real address> tuple. The present invention recognizes that each memory location in a PRAM is represented by a real address. In one embodiment, the real address of the memory location at offset 0xC000 on a PRAM with MID=0x89 is represented as the real address 0x8900_0000_0000_C000 (corresponding to pointer-like reference <0x89, 0xC000>). In various embodiments, the real addresses may be further abstracted by a second level of MID to real address mappings (e.g. so that the one or more MIDs are not a requisite to appear in the real address). In this example and embodiment, if the PRAM was three terabytes (TB) in size, server application would refer to PRAM Table 802 (i.e., FIG. 8) to determine the highest real address is 0x8900_02_ff_ffff_ffff (corresponding to pointer-like reference <0x89, 0x2ff_ffff_ffff> and physical address 0x0000_0bff_ffff_ffff). In an alternative embodiment, the pointer-like reference of a real address is 0xC000 on a PRAM with MID=0x36 is represented as 0x3600_0000_0000_C000. In this example and embodiment, server application 122 would refer to PRAM Table 802 (i.e., FIG. 8) and determine that the PRAM was one TB in size and, additionally, would determine that the highest real address is 0x3600_00ff_ffff_ffff (corresponding to pointer-like reference <0x36, 0xff_ffff_ffff and physical address 0x0000_0cff_ffff_ffff). Server application 122 operates to translate from real address to pointer-like reference (when storing a pointer-like reference), or from pointer-like reference to real address (when loading a pointer-like reference).

In various embodiments, the PRAMs operate as working storage memory, and include, but are not limited to, stack, heap, etc. In this example and embodiment, server application 122 attempts to access the PRAM, attached to computer system 120, wherein, the page frames of the PRAM are zeroed out before communicating applications to one or more hosts, such as host 126A-C. In some embodiments of the present invention, the PRAMs operate as persistent memory storage and include, but are not limited to, file system disk blocks, database persistent storage, etc. In one embodiment, server application 122 operates a direct load/store attempt. In this example and embodiment, server application 122 receives a page fault and does not determine that a host, such as host 126A-C has access to one or more memory regions corresponding to a pointer-like reference. As recognized above, the plurality of pointer-like references stored on the PRAM are <MID, relative real address> tuples, wherein, the CPU (i.e., server application 122) is not capable of determining whether a real page has been mapped inside the virtual address space of one or more hosts 126A-C or application programs. In addition, various embodiments of the present invention recognize that the architecture of the PRAM includes, but is not limited to, storing pre-mapped persistent pages (e.g., via shmat( ), mmap( ), etc.) on the PRAMs before server application 122 is permitted to access the real pages via load/store.

Figure 2:
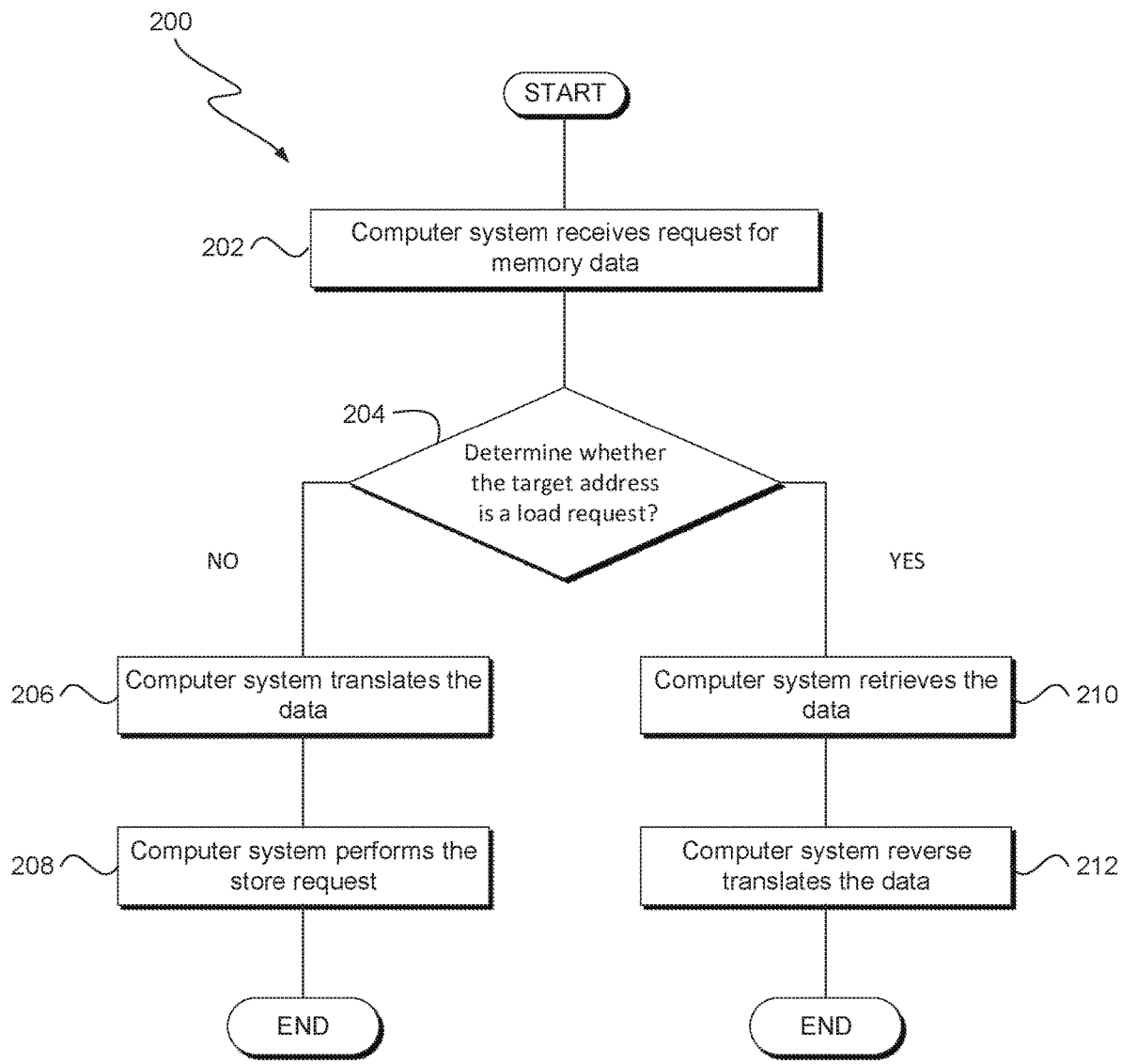
FIG. 2 illustrates operational processes of executing a system to generate memory references, on a computing device within the environment of FIG. 1, in accordance with an exemplary embodiment of the present invention.

FIG. 2 is a flowchart depicting operations for executing a load/store on persistent memory system for computing environment 100, in accordance with an illustrative embodiment of the present invention. More specifically, FIG. 2, depicts combined overall operations 200, of server application 122 executing on computer system 120. Wherein, server application 122 communicates with computer interface 124, hosts 126A-C, and database 132 located on server 130. In some embodiments, operations 200 represents logical operations of server application 122. It should be appreciated that FIG.

2 provides an illustration of one implementation and does not imply any limitations with regard to the environments in which different embodiments may be implemented. Many modifications to the depicted environment may be made. In one embodiment of flowchart 200, the series of operations can be performed in any order. In another embodiment, the series of operations, of flowchart 200, can be performed simultaneously. Additionally, the series of operations, in flowchart 200, can be terminated at any operation. In addition to the features previously mentioned, any operations, of flowchart 200 can be resumed at any time.

In operation 202, host 126A-C executing on computer system 120 generates a memory data request involving a reference to a memory location in a PRAM. In various embodiments, as recognized above, host 126A-C generates the memory data request to access data stored on a VM. In various embodiments, host 126A-C communicates the memory data request to server application 122. In various embodiments, host 126A-C operates to store and load memory data to the memory location on a PRAM. In one example and embodiment, host 126A-C generates a memory data request to store data in the memory location of a PRAM and communicates this request to server application 122. The memory data request in operation 202 may be a load or a store and involves two distinct addresses. In various embodiments, the first address is the target of the load or store and refers to the memory location (DRAM or PRAM) to which the pointer-like reference will be stored, or from which it will be loaded. Additionally, the second address is the reference that will actually be stored or loaded. In various embodiments of the present invention, server application 122 perform a forward translation of the target application virtual address to a physical address. Server application 122 perform the forward translation by making reference to page table 804 and PRAM table 802.

In one example and embodiment, server application 122 receives a store pointer-like reference memory data request from host 126A-C: stp, r4, 0(r30) (i.e. store, as a pointer like reference, the current reference value in register 4 into the target memory location at offset 0 from the location referenced by register 30). In some embodiments, register 30 holds value 0x4000D000; this value represents the application virtual target address. Additionally, in this example, server application 122 refers to page table 804 (i.e., FIG. 8) to translate the target virtual address to a target real address: 0x8900_0000_0000_D000. In some embodiments, server application 122 refers to PRAM table 802 to translate the target real address to a target physical address: 0x0000_0900_0000_D000. In this example, server application 122 communicates with a PRAM to store data, server application 122 communicates the store instruction: stp, r4, 0(r30) to the PRAM. Additionally, in this example, server application 122 references PRAM table 802 (i.e., FIG. 8) to translate the PRAM real address to a virtual address, wherein, the value 0(r30) of the instruction is translated to 0x89_0000_0000_D000, and r4 begins with the effective real address 0x40000000. As recognized above, the CPU is unable to locate and store the memory data of r4 into 0x89_0000_0000_D000 based, at least in part, because the CPU is unable to determine whether the real page frame has been mapped inside the virtual address, additionally, the CPU is unable to store a physical address in a virtual address.

In the embodiment depicted in FIG. 2, server application 122 determines whether or not the memory data request is a store (i.e., write a pointer-like reference to DRAM and/or PRAM) or a load (i.e., read a pointer-like reference from DRAM and/or PRAM) (operation 204). While FIG. 2 depicts decision 204 as a binary decision for illustrative simplicity, other embodiments are not limited to identifying one of two validations. In other embodiments, decision 204 represents operations to identify an appropriate validation from among three or more validations.

If server application 122 determines that the memory data request is a store request (decision 204, NO branch), server application 122 performs a forward translation of the pointer-like reference to be stored at the target address (operation 206). If server application 122 determines that the memory data request is a load (decision 204, YES branch), server application 122 load the pointer like reference from the DRAM or PRAM memory location corresponding to the target physical address.

In operation 204, server application 122 and computer system 120 determine whether the memory data request is a store (i.e., write a pointer-like reference to DRAM or PRAM) or a load (i.e., read a pointer-like reference from DRAM or PRAM). In various embodiments, if the memory data request is a store then processing of the request will continue with operation 206. If the memory data request is a load, then processing of the request will continue with operation 210.

In one embodiment and example, server application 122 determines that the memory data request "stp r4, 0(r30)" is a store and continue with operation 206. In a second embodiment and example, server application 122 determines that the memory data request "ldp r4, 0(r30)" is a load and continues with operation 210.

In operation 206, server application 122 performs a forward translation of the pointer-like reference to be stored at the target address. In various embodiments, server application 122 performs the forward translation, wherein, server application 122 refers to page table 804 (i.e., FIG. 8) and PRAM table 802 (FIG. 8).

In one embodiment and example, the memory data instruction is "stp r4, 0(r30)", and register 4 contains the reference application virtual address to be stored as a pointer-like reference into DRAM and/or PRAM. Additionally, in this embodiment and example, register 4 represents a value 0x50000000, server application 122 reference page table 804 (FIG. 8) to translate the application virtual address to a real address: 0x3600_0000_0000_0000. In some embodiments, server application 122 then reference PRAM table 802 (FIG. 8) to translate the real address to a pointer-like reference including a MID and real address offset: <0x36, 0x0>.

In various embodiments, server application 122 performs forward translation of the application virtual address to a pointer-like reference (informed by Page table 802 and PRAM table 802). In operation 212, server application 122 performs reverse translation of the pointer-like reference to an application virtual address (informed by PRAM table 802 and RVT table 804). Either of those translation operations may fail. A failure could occur for multiple reasons, including: a malformed virtual address or pointer-like reference, reference to a memory region that the computer host 126A-C or an application is not authorized to access, or authorized access for which a translation entry has not yet been created. Server application 122 may respond to a failure by generating an address fault, terminating host 126A-C or application program, or by updating Page table 802 or RVT table 804 to include an appropriate translation entry.

In some embodiments, server application 122 operates to reverse translate the real address to a virtual address to validate the host that request access to the memory data stored on the VM. In one embodiment and example, server application 122 reverse translates a load instructions, however, the load instruction was a pointer-like reference stored on a PRAM memory location that could not be reverse translated utilizing real-to-virtual table (RVT) 806, because the real address was not pre-mapped into the address space on the PRAM, as recognized above. Additionally, in this embodiment and example, server application 122 is unable to validate the host's access to the memory data stored on the VM, and subsequently, the load instructions result in a page fault.

In operation 208, server application 122 stores the pointer-like reference into the DRAM or PRAM memory location corresponding to real target address, as recognized above. In some embodiments, server application 122 executes a reverse translation (RVT) of r4 and stores the data in the memory location on the PRAM as 0x36_0000_0000_8000, as opposed to the value of 0x40000000. One having ordinary skill in the art would understand that by server application 122 storing the instructions as stp, 0x36_0000_0000_8000, 0x89_0000_0000_D000, server application 122 is transforming the memory data from a physical address to a virtual address to be properly stored on the DRAM and/or PRAM memory location.

In operation 210, server application 122 determines that the memory data request is a load. In one embodiment and example, server application 122 receives a memory data request from host 126A-C, such as, but is not limited to, "ldp r4, 0(r30)". Server application 122 operates to load into register 4 the virtual address representing the pointer-like reference currently found at offset 0 from the target virtual address in register 30, wherein, register 30 represents the value 0x4000D000. As recognized above, that target application virtual address would be translated to target physical address 0x0000_0900_0000_D000.

In various embodiments, server application 122 load the pointer like reference from the DRAM or PRAM memory location corresponding to the target physical address, as recognized above In one example, the PRAM memory location referenced by 0x0000_0900_0000_D000 (i.e., the memory location at offset 0xD000 in the PRAM with MID 0x89) contains a pointer-like reference <0x36, 0x0> this value is loaded from the PRAM memory location.

In operation 212, server application 122 loads the memory data reference by performing a reverse translation by referring to PRAM table 802 (FIG. 8) and RVT table 806 (FIG. 8). In some embodiments, server application 122 places the resultant translation from the reverse translation, as recognized above, in the register requested by the memory data request.

In one example and embodiment, server application 122 refers to PRAM table 802 (FIG. 8) to translate a pointer-like reference, such as, <x036, 0x0> to a real address, such as, 0x3600_0000_0000_0000. In various embodiments, server application 122 refers to Real-to-Virtual Table (RVT Table) 806 to translate a real address, such as, 0x3600_0000_0000_0000 to an application virtual address, such as, 0x5000_0000. In addition to server application 122 translating the address, recognized above, server application 122 places the application virtual address in register 4 as requested by memory data request "ldp r4, 0(r30)".

In one embodiment and example, server application 122 locates and retrieves the memory data from the stack, as recognized above. Server application 122 communicates the memory data host 126A-C. In various embodiments, host 126A communicates the memory data request and server application 122 locates and retrieves the memory data as depicted in FIG. 2, however, server application 122 communicates, at least, the memory data and/or the physical and virtual address of the memory data to one or more hosts.

In some embodiments and examples, server application 122 stores the data as a virtual address which provides the one or more addresses to reside on the DRAM and/or PRAM memory location during, but is not limited to, reboots, power-ups, and is accessible by multiple hosts. In some embodiments, host 126A stores memory data on the PRAM, as recognized above, using the store instructions stp, r4, 0(r30). Additionally, in this embodiment, host 126B operates to load the memory data that host 126A stored at 0(r30), however, in this instance, host 126B has memory data stored in this memory location. Server application 122 executes aliasing for host 126A-C, wherein, one or more application virtual addresses residing on the host may refer to one or more identical memory locations on the DRAM and/or PRAM. host 126B to access the data that host 126A stored on 0(r30). Server application 122 executes aliasing utilizing, at least, but is not limited to, forward translation using PRAM table 502 and RVT. Server application 122 operates to perform RVT through aliasing based, at least in part, but is not limited to, hints provided by the OS (e.g., user space vs. kernel space), specificity of the mappings (e.g., page size), age of a mapping (e.g., use oldest mapping and/or newest mapping), numerical value of the address (e.g., use the highest address or the lowest), and fault to the OS and let the OS decide if it can resolve the fault.

In various embodiments, server application 122 operates to retrieve the memory data from the VM utilizing, at least, the pointer-like reference stored on the PRAM. In one embodiment, server application 122 operates to utilize the pointer-like reference, as recognized above, to locate the memory data stored on the VM (i.e., database 132). Additionally, server application 122 operates to utilize the pointer-like reference to locate memory data on the VM (i.e., database 132) and load the data (i.e., shrink the stack) and communicate the data to host 126A-C. In various embodiments, server application 122 operates to utilize the pointer-like reference that was generated, as recognized above. In this embodiment, server application analyzes the pointer-like reference stored on the PRAM to locate the memory data location on the VM. In one example and embodiment, server application 122 operates to execute load instructions: ldp, r4, 0(r30). Server application 122 identifies that r30=0x3000_1000 and determines that the value r30 was a PRAM pointer-like reference that had been successfully translated via the RVT on the CPU (i.e., server application 122). In this example and embodiment, server application 122 operates to locate and retrieve the memory data stored on the VM based, at least in part, on the pointer-like reference server application 122 identified on the PRAM.

Figure 3:
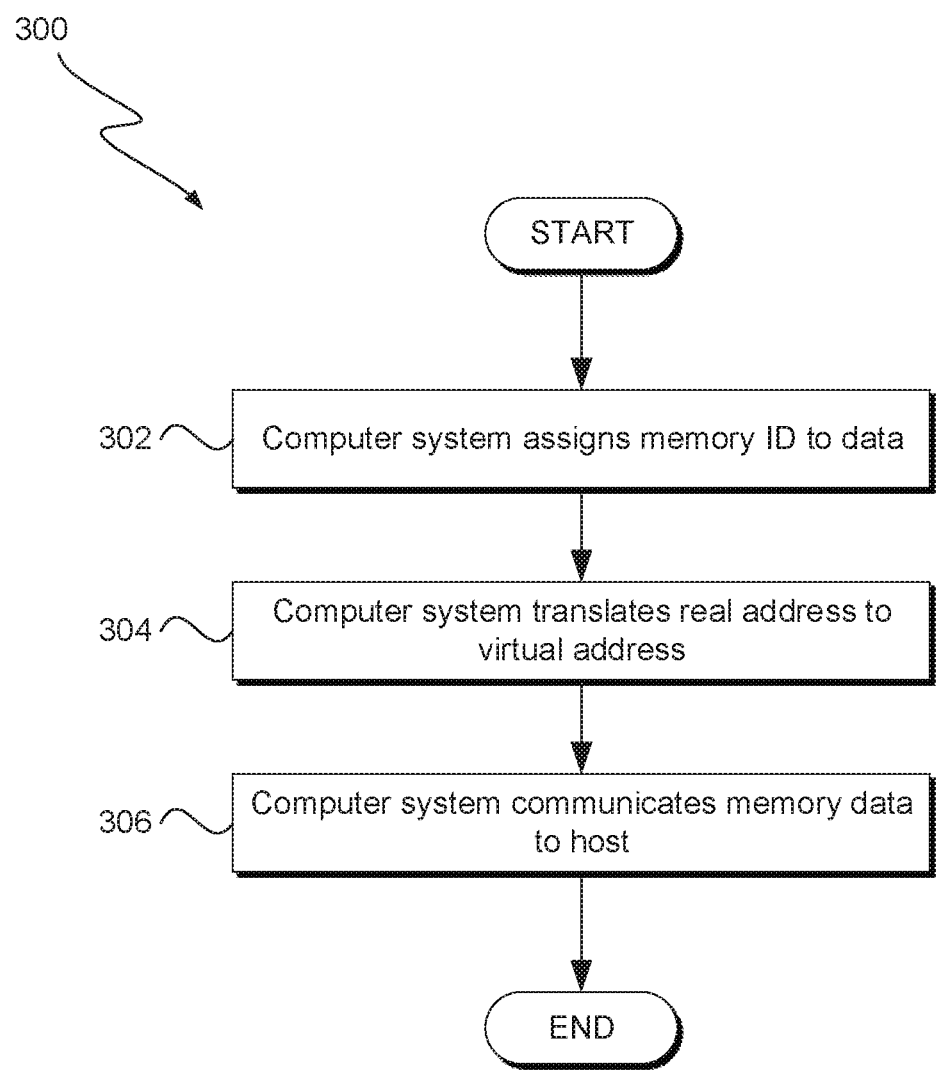
FIG. 3 illustrates operational process of executing a system to generate memory references on a computing device within the environment of FIG. 1, in accordance with an exemplary embodiment of the present invention.

FIG. 3 is a flowchart depicting operations for executing address translation of memory data for computing environment 100, in accordance with an illustrative embodiment of the present invention. More specifically, FIG. 3, depicts combined overall operations 300, of server application 122 executing on computer system 120. In some embodiments, operations 300 represents logical operations of server application 122, wherein host 126A-C represents interactions between logical units executing on computer system 120. It should be appreciated that FIG. 3 provides an illustration of one implementation and does not imply any limitations with regard to the environments in which different embodiments may be implemented. Many modifications to the depicted environment may be made. In one embodiment of flowchart 300, the series of operations can be performed in any operation. In addition to the features previously mentioned, any operations, of flowchart 300, can be resumed at any time.

In operation 302, server application 122 (e.g., hypervisor) assigns a unique system wide memory ID (MID) to each physical memory area located on the PRAM during initial program load of the system. As recognized above, MIDs are integrated with the respective relative address of each physical memory area to generate a <MID, relative address> tuple, which represents a pointer-like reference (i.e., physical address). In some embodiments, server application 122 generates a pointer-like reference (i.e., physical address) by utilizing the MID and the offset relative of each, respective, physical memory area. Server application 122 stores the one or more pointer-like references on each, respective, physical memory area (i.e., PRAM).

In operation 304, server application 122 receives program instructions from host 126A-C to store/load memory data from the VM, by accessing the pointer-like references stored on the PRAM (i.e., memory data request). In some embodiments, server application 122 identifies the store/load program instructions and accesses the PRAM Table 802 (i.e., FIG. 8). Server application 122 operates to translate the store/load instructions based, at least in part, on the PRAM Table 1. Server application 122 translates the MID and offset relative into a real address, as recognized above, and locates the pointer-like reference on the PRAM. Server application 122 locates the correct location of the memory data on the VM. In various embodiments, server application 122 operates to translate the physical address into a virtual address based, at least in part, on the real-to-virtual table 806 (i.e., FIG. 8). Additionally, server application 122 operates to reverse translate the real address to a virtual address to validate that the host has access to the memory data stored on the VM. If server application 122 authenticates that the host has access to the memory data stored on the VM, server application 122 retrieves the memory data. In this example and embodiment, server application 122 reverse translates the load instruction: ldp, r4, 0(r30), wherein, r30 is translated to 0x4000_0000 which represents a valid PRAM pointer-like reference. In some embodiments, server application 122 communicates the retrieved memory data to the host program that initially requested the memory data (operation 306).

In some embodiments, server application 122 operates to reverse translate the real address to a virtual address to validate the host that requested access to the memory data stored on the VM. In this example and embodiment, server application reverse translates the load instruction: ldp, r5, 0(r31), wherein r31 was a PRAM reference that could not be reverse translated using the real-to-virtual table, because 0x36_0000_0000_5000 is not pre-mapped into the address space of the application, as recognized above. Additionally, in this example and embodiment, server application 122 does not validate the host's access to the memory data stored on the VM, this load instructions results in a page fault. Additionally, server application 122 identifies that the real address was a PRAM pointer-like reference that server application 122 could not reverse translate utilizing the real-to-virtual table 804. In this example and embodiment, server application 122 communicates the page fault to host 126A-C instructing host 126A-C to install a valid page table entry (PTE) and real-to-virtual table entry and restart the memory data request.

Figure 4:
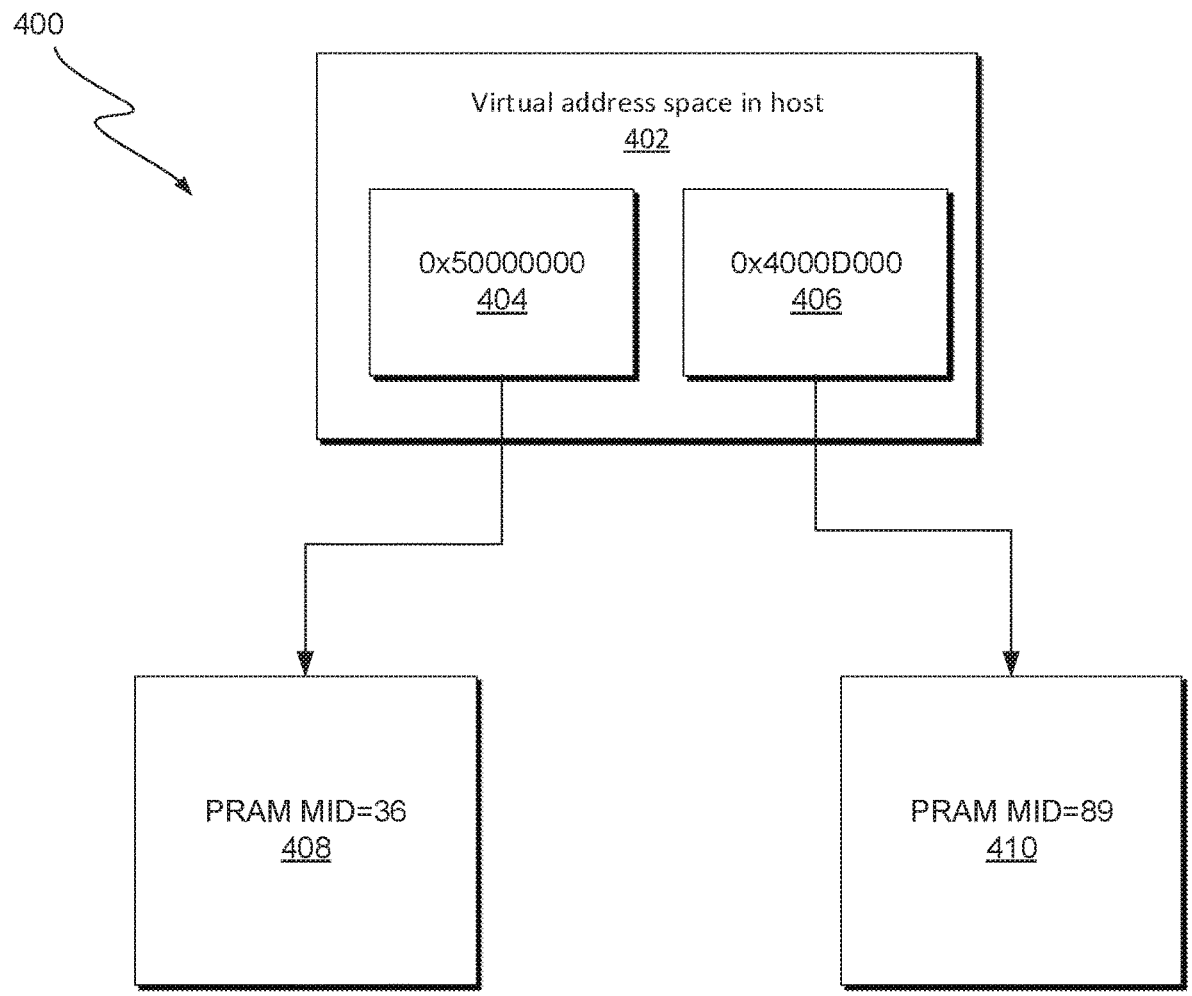
FIG. 4 depicts an environment of a memory region executing a system to translate and determine the address of a memory reference within the computing environment depicted in FIG. 1, in accordance with an exemplary embodiment of the present invention.

FIG. 4 is a functional block diagram, 400, of components of computer system 120 and server 130, in accordance with an illustrative embodiment of the present invention. It should be appreciated that FIG. 4 provides only an illustration of one implementation and does not imply any limitations with regard to the environment in which different embodiments may be implemented. Many modifications to the depicted environment may be made.

In various embodiments of the present invention, virtual address space in host 402 represents data (i.e., I/O) that the one or more hosts, executing on a computer system (i.e., computer system 120), communicate and request data from a database (i.e., database 134). In one embodiment and example, feature 404 and feature 406 represent store and load instructions, respectively. It should be appreciated that feature 404 and feature 406 provide only an illustration of one implementation of a store and load instructions and do not imply any limitations with regard to the present embodiment. Many different store and load instructions may be depicted in the present embodiment and are not limited thereto. In some embodiments, feature 408 and feature 410 illustrate the respective address space that the data represented by feature 404 and feature 406 are to be stored at, respectively. It should be appreciated that feature 408 feature 410 are not limited to the illustrations provided in the present embodiment. Many different address spaces for data to be either stored or loaded in may be depicted in the present embodiment and are not limited thereto.

Figure 5:
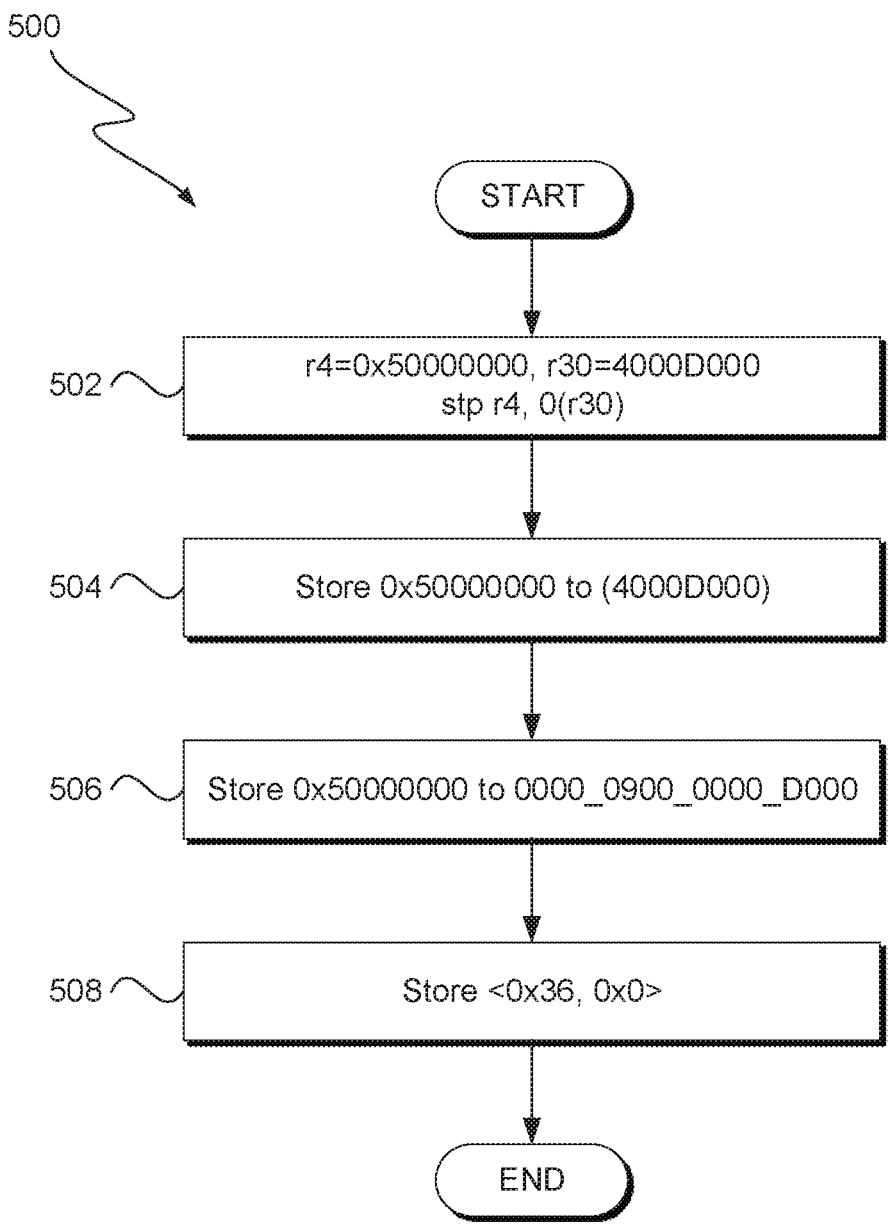
FIG. 5 illustrates operational processes of executing a system to store a memory reference on a computing device within the environment of FIG. 1, in accordance with an exemplary embodiment of the present invention.

FIG. 5 is a flowchart depicting operating for executing a store instruction on a DRAM and/or PRAM memory location, in accordance with an illustrative embodiment of the present invention. More specifically, FIG. 5, depicts combined overall operations 500, of server application 122 executing on computer system 120. Wherein, server application 122 communicates with computer interface 124, hosts 126A-C, and database 132 located on server 130. It should be appreciated that FIG. 5 is depicted for illustrative simplicity and provides only one implementation of a store instruction and does not imply any limitations with regard to the present invention. Many different store instructions may be depicted in the present embodiment and are not limited thereto.

In various embodiments of the present invention, server application 122 operates to receive store instructions from host 126A-C: stp r4, 0(r30) (operation 502). Additionally, server application 122 operates to store the data in the address provided in the instructions (operation 504). Server application 122 refer to page table 804 (i.e., FIG. 8) to translate the target virtual address to a target real address (operation 506). Wherein, server application 122 locates the address location on the DRAM and/or PRAM memory location stores the pointer-like reference including a MID and real address offset (i.e., <0x36, 0x0>) (operation 508).

Figure 6:
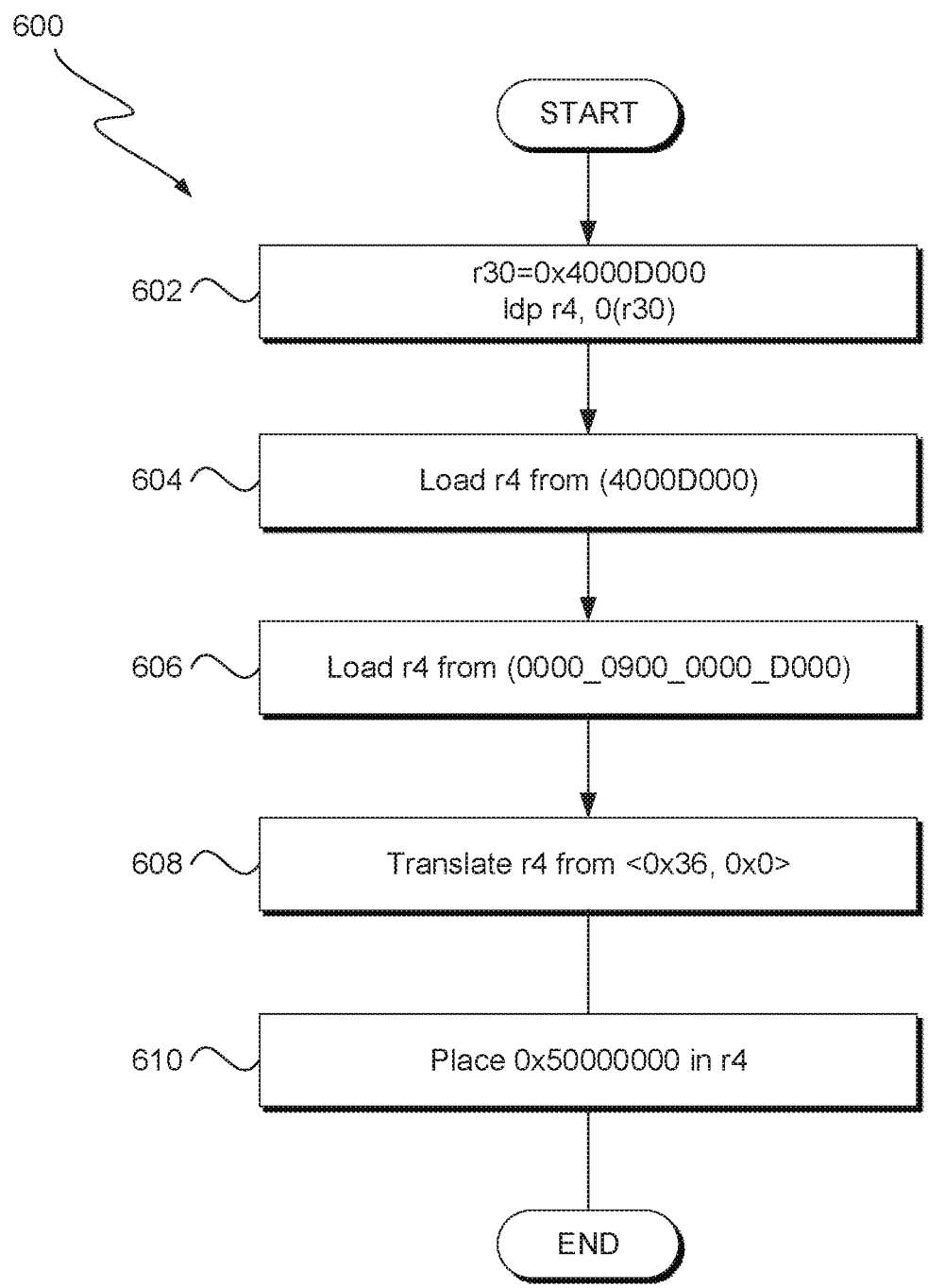
FIG. 6 illustrates operational processes of executing a system to load a memory reference on a computing device within the environment of FIG. 1, in accordance with an exemplary embodiment of the present invention.

FIG. 6 is a flowchart depicting operating for executing a load instruction on a DRAM and/or PRAM memory location, in accordance with an illustrative embodiment of the present invention. More specifically, FIG. 6, depicts combined overall operations 600, of server application 122 executing on computer system 120. Wherein, server application 122 communicates with computer interface 124, hosts 126A-C, and database 132 located on server 130. It should be appreciated that FIG. 6 is depicted for illustrative simplicity and provides only one implementation of a load instruction and does not imply any limitations with regard to the present invention. Many different load instructions may be depicted in the present embodiment and are not limited thereto.

In one embodiment and example of the present invention, server application 122 determines that the memory data request is a load instruction, wherein, server application 122 identifies that ldp r4, 0(r30) is a pointer-like reference indicating the memory data is located at r30=0x4000D000 (operation 602). Server application 122 communicates with the memory location on the DRAM and/or PRAM and operates to retrieve the memory data from the address location (i.e., 4000D000 on register 4) (operation 604). Server application 122 refers to page table 804 to translate the starting physical address to a starting real address (operation 606). Additionally, in this embodiment and example, server application 122 refers to RVT 806 to reverse translate the physical real address to a virtual address (i.e., reverse translating <0x36, 0x0> to 0x50000000) (operation 608). Lastly, server application 122 places the translated value, 0x50000000, into register 4 (operation 610).

Figure 7:
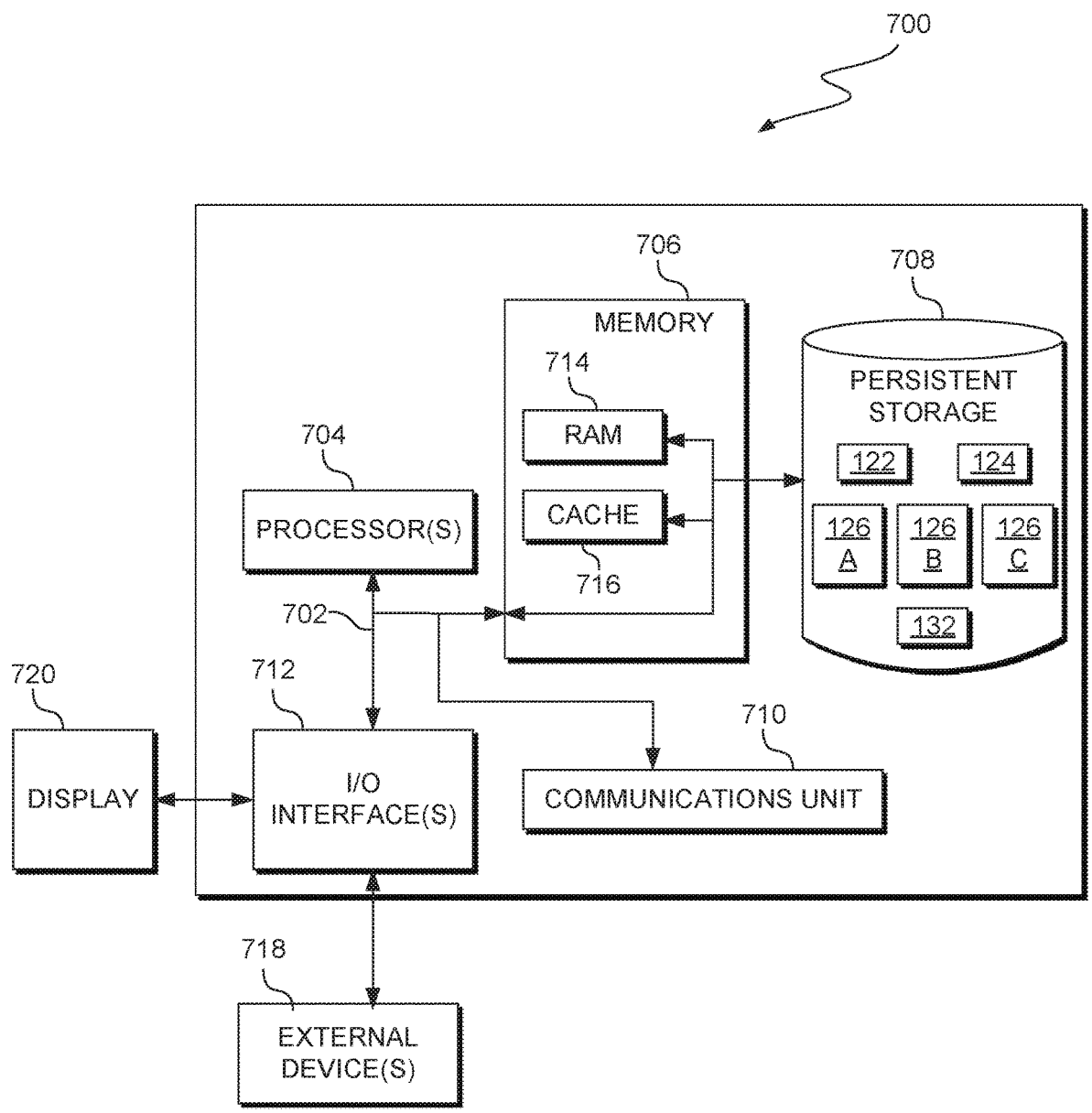
FIG. 7 depicts a block diagram of components of one or more computing devices within the computing environment depicted in FIG. 1, in accordance with an exemplary embodiment of the present invention.

FIG. 7 depicts a block diagram, 700, of components of computer system 120 and server 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 120 and server 130 includes communications fabric 702, which provides communications between computer processor(s) 704, memory 706, persistent storage 708, communications unit 710, and input/output (I/O) interface(s) 412. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Server application 122, computer interface 124, host 126A-C and database 132 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 110. In these examples, communications unit 710 includes one or more network interface cards. Communications unit 710 may provide communications through the use of either or both physical and wireless communications links. Server application 122, computer interface 124, host 126A-C and database 132 may be downloaded to persistent storage 708 through communications unit 410.

I/O interface(s) 712 allows for input and output of data with other devices that may be connected to computer system 120 and server 130. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., Server application 122, computer interface 124, host 126A-C and database 132 can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

In accordance with FIG. 8, PRAM table 802, page table 804, and RVT table 806 represents data that server application 122 references to translate memory ID, relative real addresses, virtual address, or any combination to execute a memory data operation (i.e., store and/or load instruction).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method comprising:
generating, by one or more processors, a memory reference to a region of memory of a persistent memory, wherein the memory reference is independent of where the memory is accessible by a computing system;
receiving, by one or more processors, from a first host, instructions to perform a first memory data operation on the persistent memory, wherein the instructions to perform the first memory data operation include a first address associated with the first host;
translating, by one or more processors, the first address into an address associated with the memory reference based, at least, on an address table associated with the first host;
executing, by one or more processors, the first memory data operation on the persistent memory utilizing the address associated with the memory reference;
receiving, by one or more processors, from a second host, instructions to perform a second memory data operation on the persistent memory, wherein the instructions to perform the second memory data operation include a second address associated with the second host, and wherein the second address is different from the first address;
translating, by one or more processors, the second address into the address associated with the memory reference based, at least, on an address table associated with the second host; and
executing, by one or more processors, the second memory data operation on the persistent memory utilizing the address associated with the memory reference.

2. The computer-implemented method of claim 1, wherein the memory reference includes: (i) a memory ID, and (ii) the address associated with the memory reference.

3. The computer-implemented method of claim 2, wherein the address associated with the memory reference is a relative real address associated with the region of memory of the persistent memory.

4. The computer-implemented method of claim 1, wherein the persistent memory operates as working storage memory for the first host and the second host.

5. The computer-implemented method of claim 1, wherein the persistent memory operates as persistent storage for the first host and the second host.

6. The computer-implemented method of claim 1, wherein the first memory data operation is a load request.

7. The computer-implemented method of claim 1, wherein the first memory data operation is a store request.

8. A computer program product comprising:
one or more computer-readable storage media and program instructions stored on the one or more computer-readable storage media, the stored program instructions comprising:
program instructions to generate a memory reference to a region of memory of a persistent memory, wherein the memory reference is independent of where the memory is accessible by a computing system;
program instructions to receive, from a first host, instructions to perform a first memory data operation on the persistent memory, wherein the instructions to perform the first memory data operation include a first address associated with the first host;
program instructions to translate the first address into an address associated with the memory reference based, at least, on an address table associated with the first host;
program instructions to execute the first memory data operation on the persistent memory utilizing the address associated with the memory reference;
program instructions to receive, from a second host, instructions to perform a second memory data operation on the persistent memory, wherein the instructions to perform the second memory data operation include a second address associated with the second host, and wherein the second address is different from the first address;
program instructions to translate the second address into the address associated with the memory reference based, at least, on an address table associated with the second host; and
program instructions to execute the second memory data operation on the persistent memory utilizing the address associated with the memory reference.

9. The computer program product of claim 8, wherein the memory reference includes: (i) a memory ID, and (ii) the address associated with the memory reference.

10. The computer program product of claim 9, wherein the address associated with the memory reference is a relative real address associated with the region of memory of the persistent memory.

11. The computer program product of claim 8, wherein the persistent memory operates as working storage memory for the first host and the second host.

12. The computer program product of claim 8, wherein the persistent memory operates as persistent storage for the first host and the second host.

13. The computer program product of claim 8, wherein the first memory data operation is a load request.

14. The computer program product of claim 8, wherein the first memory data operation is a store request.

15. A computer system comprising:
one or more computer processors;
one or more computer readable storage medium; and
program instructions stored on the computer readable storage medium for execution by at least one of the one or more processors, the stored program instructions comprising:
program instructions to generate a memory reference to a region of memory of a persistent memory, wherein the memory reference is independent of where the memory is accessible by a computing system;
program instructions to receive, from a first host, instructions to perform a first memory data operation on the persistent memory, wherein the instructions to perform the first memory data operation include a first address associated with the first host;
program instructions to translate the first address into an address associated with the memory reference based, at least, on an address table associated with the first host;
program instructions to execute the first memory data operation on the persistent memory utilizing the address associated with the memory reference;
program instructions to receive, from a second host, instructions to perform a second memory data operation on the persistent memory, wherein the instructions to perform the second memory data operation include a second address associated with the second host, and wherein the second address is different from the first address;
program instructions to translate the second address into the address associated with the memory reference based, at least, on an address table associated with the second host; and
program instructions to execute the second memory data operation on the persistent memory utilizing the address associated with the memory reference.

16. The computer system of claim 15, wherein the memory reference includes: (i) a memory ID, and (ii) the address associated with the memory reference.

17. The computer system of claim 15, wherein the persistent memory operates as working storage memory for the first host and the second host.

18. The computer system of claim 15, wherein the persistent memory operates as persistent storage for the first host and the second host.

19. The computer system of claim 15, wherein the first memory data operation is a load request.

20. The computer system of claim 15, wherein the first memory data operation is a store request.

* * * * *